US010282314B2

(12) United States Patent
Plancherel et al.

(10) Patent No.: US 10,282,314 B2
(45) Date of Patent: May 7, 2019

(54) SYNCHRONIZATION OF COMPUTER PERIPHERAL EFFECTS

(71) Applicant: Logitech Europe S.A., Lausanne (CH)

(72) Inventors: Laurent Plancherel, Lausanne (CH); Xavier Bize, Metz-Tessy (FR); William Prescott, Fremont, CA (US); Nanda Kutty, Union City, CA (US)

(73) Assignee: Logitech Europe S.A., Lausanne (CH)

( * ) Notice: Subject to any disclaimer, the term of this patent is extended or adjusted under 35 U.S.C. 154(b) by 0 days.

(21) Appl. No.: 16/147,272

(22) Filed: Sep. 28, 2018

(65) Prior Publication Data

US 2019/0034362 A1 Jan. 31, 2019

Related U.S. Application Data

(63) Continuation of application No. 14/830,404, filed on Aug. 19, 2015, now Pat. No. 10,114,769.

(51) Int. Cl.
*G06F 13/10* (2006.01)
*G06F 9/52* (2006.01)

(52) U.S. Cl.
CPC .............. *G06F 13/102* (2013.01); *G06F 9/52* (2013.01)

(58) Field of Classification Search
CPC ........ G06F 13/102; G06F 9/52; G06F 13/423; G06F 5/06; H05B 37/0272
See application file for complete search history.

(56) References Cited

U.S. PATENT DOCUMENTS

2009/0033512 A1* 2/2009 Tonry ........................ G06F 1/16 340/815.75
2012/0302343 A1* 11/2012 Hurst ................. H04N 21/4325 463/31
2013/0067116 A1* 3/2013 Ostergren ........... H04L 65/4069 709/248
2013/0091430 A1* 4/2013 Zhai ........................ G06T 5/007 715/716
2014/0330994 A1* 11/2014 Mishra ................ H04L 25/4902 710/105
2014/0351459 A1* 11/2014 Chang .................. G06F 13/385 710/14

* cited by examiner

*Primary Examiner* — Tim T Vo
*Assistant Examiner* — Herve Iradukunda
(74) *Attorney, Agent, or Firm* — Kilpatrick Townsend & Stockton LLP

(57) ABSTRACT

Synchronization of effects across multiple devices using local, distributed control, and eliminating the need for central direction of the effects with the associated large bandwidth required. In one embodiment, each device stores data and instructions for creating its own effects. The devices periodically communicate with a host or each other to maintain synchronization, and compensate for any drift. This approach minimizes the use of bandwidth and battery power in the devices.

20 Claims, 3 Drawing Sheets

102
Keyboard
Data memory 120
112 Vibrator
118 Program memory
μP 116
Light system 108
Speaker 114
Transceiver 122
106
Host
Transceiver 140
104
Mouse
130 Data memory
124 Vibrator
132 Program memory
μP 128
Light system 110
Speaker 126
Transceiver 134
Router/ hub 142

SYNCHRONIZATION OF COMPUTER PERIPHERAL EFFECTS

CROSS-REFERENCES TO RELATED APPLICATIONS

This application is a continuation of Ser. No. 14/830,404, filed May Aug. 19, 2015, titled, "SYNCHRONIZATION OF COMPUTER PERIPHERAL EFFECTS," which is hereby incorporated by reference in its entirety for all purposes.

BACKGROUND OF THE INVENTION

The present invention relates to the synchronization of lighting and other effects on computer peripheral devices.

Many devices, such as keyboards and mice, have decorative or indicator lighting. In particular, many input and control devices used for gaming have such lighting and other effects, such as vibrations. An example describing keyboard lighting effects is US Pub. No. 20150108903, Logitech and other keyboard and peripheral makers have keyboards and other devices with cosmetic lighting effects. Razer and Corsair make keyboards with lighting effects that are customizable and can be synchronized with lighting effects on other devices, such as a mouse. It is believed that such devices use a personal computer as the synchronization source, with the PC sending out commands to each device over a wired USB connection. The PC coordinates the synchronization.

BRIEF SUMMARY OF THE INVENTION

The present invention provides the synchronization of effects across multiple devices using local, distributed control, and eliminating the need for central direction of the effects with the associated large bandwidth required. In one embodiment, each device stores data and instructions for creating its own effects. The devices periodically communicate with a host or each other to maintain synchronization, and compensate for any drift. This approach minimizes the use of bandwidth and battery power in the devices.

In one embodiment, each device initiates an identified effect in response to a start signal from a host. The device then periodically provides an indication to the host of where it is in the effect sequence. The host sends a synchronization correction message to the device when it is out of synchronization by more than a predetermined amount. The report can simply be a timer indicating the position in the effect, which is synchronized with a timer in the host. In one embodiment, the device report signal is sent only once, in the first half, or near the beginning of an effect cycle, such as ¼ or ⅓ into the effect.

In one embodiment, the user can select an effect, and select to have it synchronized with other devices. Once synchronized, the devices stay synchronized without further user input, even if the user changes the effects.

In one embodiment, the effect is displayed simultaneously on a host computer, and is separately generated on the host computer.

DETAILED DESCRIPTION OF THE INVENTION

Figure 1:
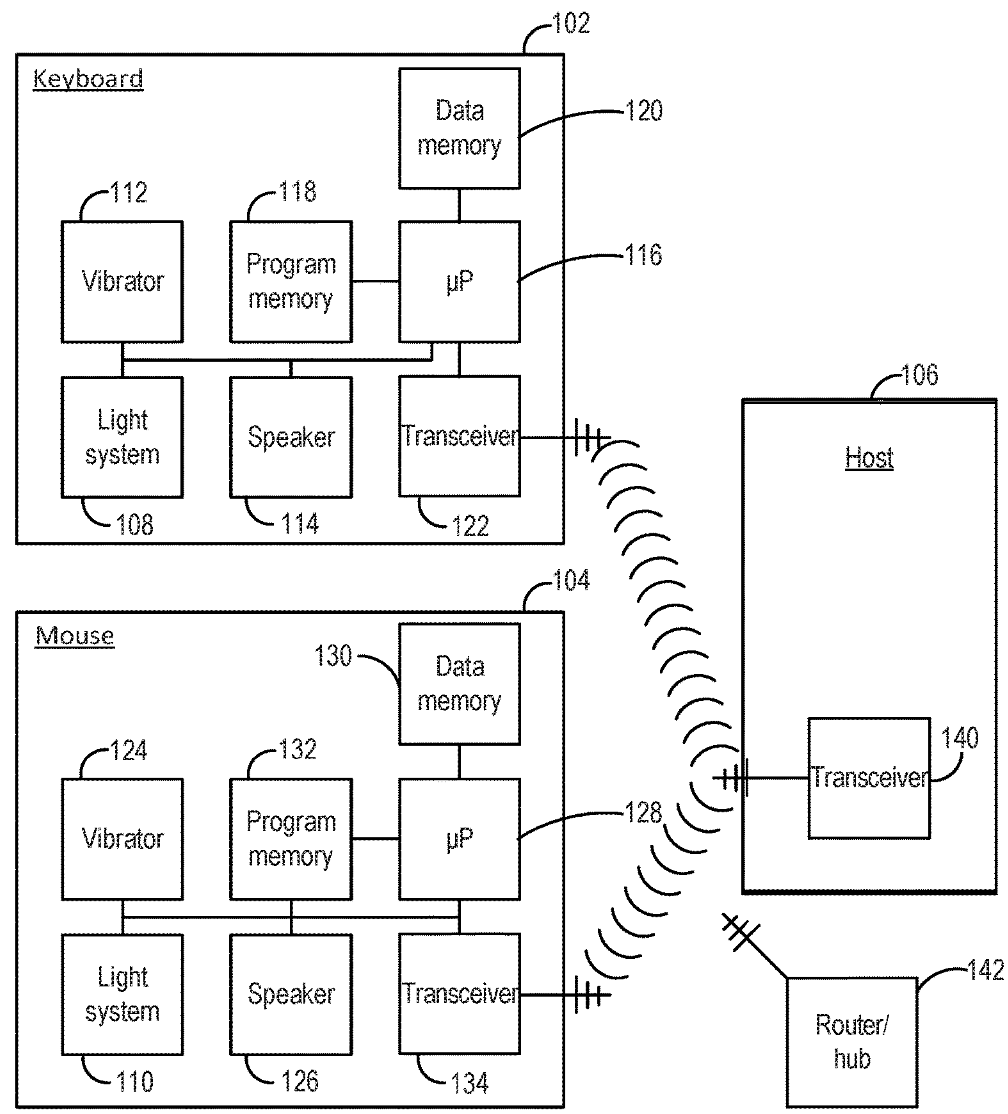
FIG. 1 is a block diagram of multiple synchronized devices according to an embodiment of the invention.

FIG. 1 is a block diagram of multiple synchronized devices according to an embodiment of the invention. A keyboard 102, mouse 104 and personal computer 106 are shown. Keyboard 102 has a lighting system 108, and mouse 104 has a lighting system 110. Additional devices with their own lighting systems, or other effects to be synchronized, can be added. For example, a game pad or game controller can also have lighting or other effects. Other input devices would include a headset, a joystick, touchpad, steering wheel, or any other computer or gaming input device. Alternately, effects systems can be placed in non-peripheral devices, such as a mousepad, a stand, or the frame or display of the host itself.

Keyboard 102 also has a vibrator 112 and a speaker 114 for providing haptic and sound effects which can be synchronized as well. A controller 116 controls the various effects systems using a program in program memory 118 and data in a data memory 120. In one embodiment, program memory 118 can be partially in firmware or ROM. A transceiver 122 allows the wireless downloading of effects, and the wireless reporting of effect timing.

Mouse 104 can similarly have a vibrator 124 and speaker 126. It also has a controller 128, data memory 130, program memory 132, transceiver 134 and antenna 136. The transceiver and antenna also allows for the downloading of synchronization effects and programs and the reporting back to personal computer 106 or to keyboard 102 of the status of the various effects.

Personal computer 106 has its own transceiver 140. Alternately, a router or hub 142 could be used to interconnect the various devices that provide the communication link. In addition, the router or hub or other device could function as the host, as well as providing the communication link.

Figure 2:
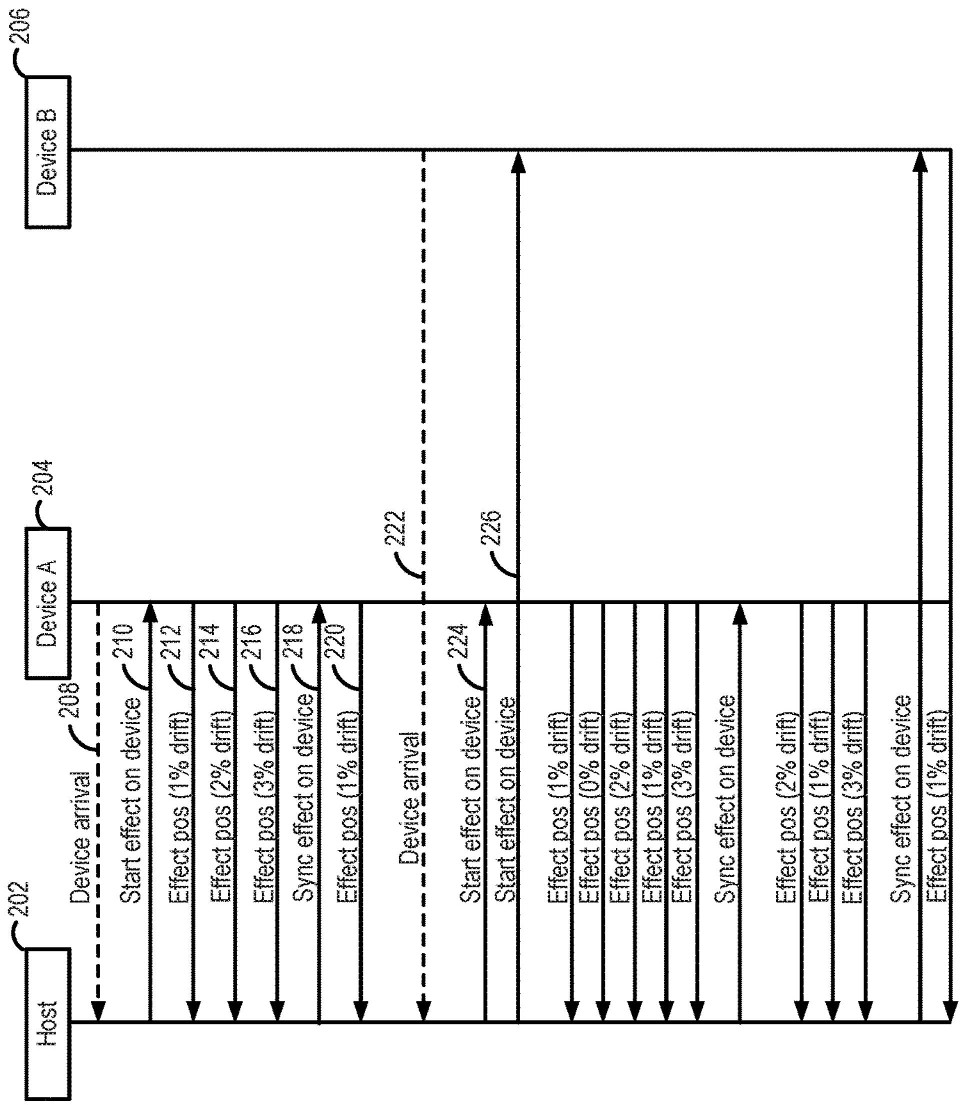
FIG. 2 is a timing diagram illustrating the drift and synchronizing between a host and multiple devices according to an embodiment of the invention.

FIG. 2 is a timing diagram illustrating the drift and synchronizing between a host and the devices according to an embodiment of the invention. FIG. 2 shows a host 202, a device A (204) and a device B (206). These could be, for example, the PC, keyboard and mouse of FIG. 1. When activated, device 204 sends a report 208 to the host indicating that it has arrived and is active. The host can then send a command 210 to the device to start the effect on the device (alternately, the device can notify the host when it is starting the effect). At the same time, the host will independently compute and run the effect itself (or start a timer for the effect period) so that it can monitor the appropriate progress in the effect on the devices. The computed effect can also be displayed on the host. Alternately, the host can simply run a timer for the effect.

Device 204 then periodically reports the effect status as indicated by commands 212, 214 and 216. In the example shown, the host determines that there is 1% drift at report 212, 2% drift at report 214 and 3% drift at report 216. In this particular example, the host is programmed to reestablish synchronization, and correct the drift, when the drift equals or exceeds 3%. Thus, the host sends a synchronization signal 218 to device 204. Device 204 continues to send reports, such as a report 220, which may indicate a 1% drift again.

In the example shown, a second device 206 is activated and sends a device arrival notification 222 to the host. The host then starts the same effect on both devices at the same time, using command 224 to device 204 and command 226 to device 206 (alternately, the same command can be broadcast to both). This is followed by the continuous reports from devices 204 and 206 as shown, with the host sending a synchronization command to device 204 and device 206 when the reports indicate that a particular device is 3% or more out of synchronization.

As can be seen in FIG. 2, Device A and Device B are different such that Device A tends to drift away from the host at a faster rate than Device B. When the device is attached, the host initiates the effect on the device and remembers the time (relative to the host) when the effect was started. The device periodically sends an event to indicate the position of the device effect. The event is sent from the device at around ⅓ of the effect period. For example, if the period of the event is 12 seconds, the event is sent 4 seconds after the beginning of the effect. The host checks the position of the effect and compares it to its local position. Once the drift has exceeded a heuristically determined percentage (usually based on what is perceptible to the user). a request is sent to the device to go "backwards" or "forwards" relative to the drift amount. The figure uses an example of 3% drift. At the end of the effect, the device slows down or jumps ahead appropriately such that it is closer in sync with the host. When Device B is attached, the effect is restarted on all the devices, and the clock is reset on the host. Synchronization between multiple devices is accomplished by syncing to the same host.

In more detail, in one embodiment, after the first device is activated, the host reads the effect parameters of the device. The host (LGS) takes the period of the effect as a reference. The host runs a timer LGSTIMER_REF with the same period. LGS sends SWControl to enable device 1. LGS can initialize its own LGSTIMER_REF with the device1 effect period counter just received. It will thus avoid large corrections on the device. At this point LGS and device1 should have both timer effects synchronized. If the device 1 period_counter drifts from LGSTIMER_REF, LGS sends the drift value to device 1. The drift value is calculated this way:

drift=Min[Period−abs(LGSTIMER_REF−DeviceCounter),abs(LGSTIMER_REF−DeviceCounter)]

the sign of drift is:

negative if Period−abs(LGSTIMER_REF−DeviceCounter)>abs(LGSTIMER_REF−DeviceCounter)

positive if Period−abs(LGSTIMER_REF−DeviceCounter)<abs(LGSTIMER_REF−DeviceCounter)

Device 2 can be subsequently activated. LGS reads effect parameters of device 2. LGS makes sure the effect parameters are the same as device1, if not LGS should write the same settings (at least in terms of effect period). LGS sends SWControl enable to device 2. LGS receives device2_period_counter, compares it to LGSTIMER_REF and sends to device 2 the drift value, so that device 2 will make the adjustment. Depending on the drift value, during the first steps the effect on device 2 can stop or speed up for a moment. The drift comparison is repeated on each device.

Figure 3:
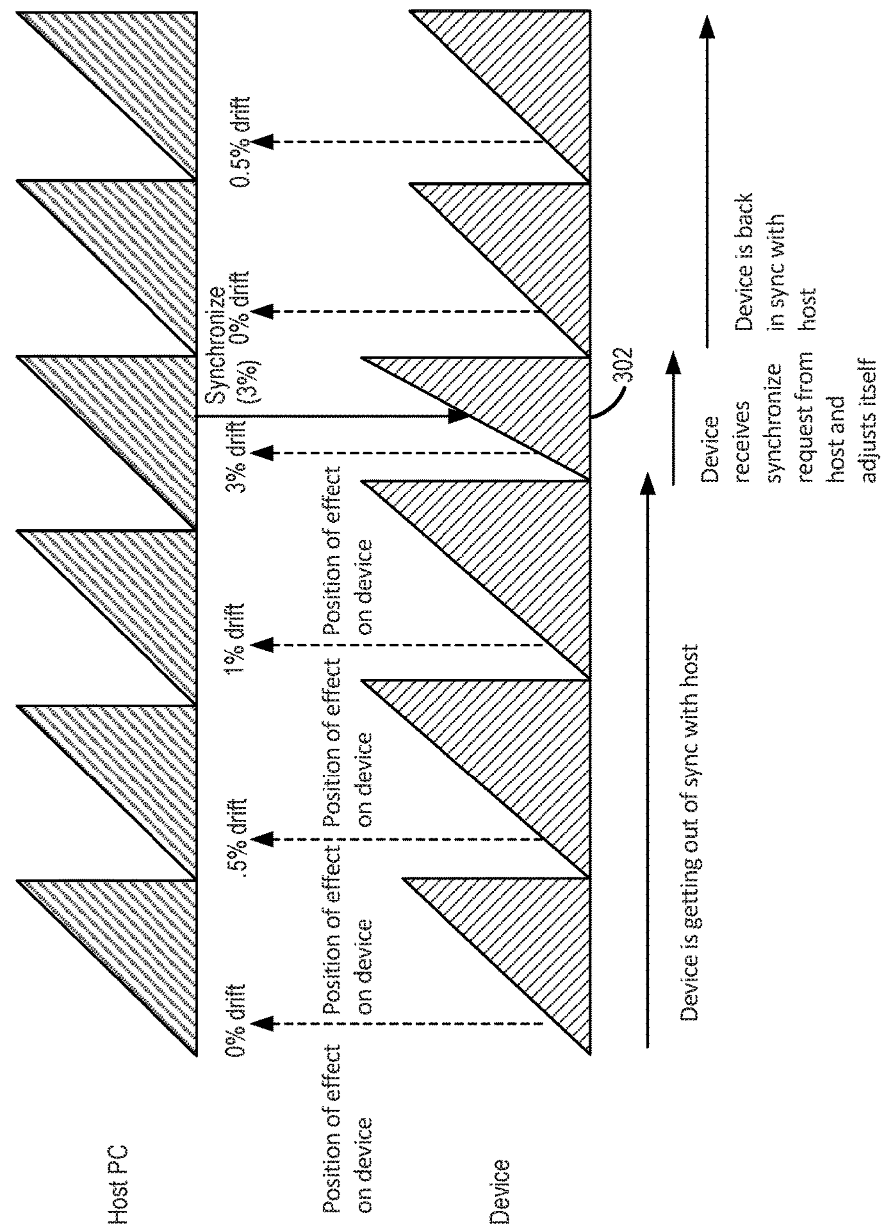
FIG. 3 is a diagram of the messaging for synchronizing between a host and a device according to an embodiment of the invention.

FIG. 3 is a diagram of the messaging for synchronizing between a host and a device according to an embodiment of the invention. This diagram is an example of a sawtooth effect started from a host to the device. The host keeps the master clock of the synchronized event. Due to errors on the device, the effect plays longer on the device than the host. The host waits for 3% drift before asking the device to synchronize itself to the host. When the request is sent by the host to the device, the device adjusts the effect to finish the period quicker by the drift amount, as shown by abbreviated sawtooth 302. When the next period of the device effect starts, it is back in sync with the host effect. In the example of FIG. 3, the report from the device is sent near the beginning of each cycle, or sawtooth, of the effect.

In one embodiment, a user interface is provided on the PC or other host device. The user can select synchronization once, and thereafter synchronization is maintained for all effects without further input from the user. The synchronization is maintained when devices power off and on again, with the effects starting again. The user can change the effects, such as the type of effect, color, etc., and the synchronization is carried over and maintained. In one embodiment, the User Interface allows the user to apply the same effect to all devices. In another embodiment, the user can change the effect on one device. If synchronization has been selected, the new effect will then be propagated to all the other devices automatically by the host.

Various methods can be used to accomplish the synchronization. The device can simply jump to the timing position the host commands. Alternately, the rate of change of the effect can be sped up, or slowed down, so there isn't an abrupt change as it comes back into synchronization. The change can take place in a portion of the effect where it will be less noticeable to the user, such as at the end of the effect cycle, or where it is the least bright.

Various other embodiments can be used. For longer effect cycles, multiple reports can be sent. Alternately, instead of periodically reporting, a device can send a single report, such as when ¼ or ⅓ of the effect has passed. This may be used, for example, for shorter effects. This cuts down on the amount of signaling required, with little noticeable difference for shorter effects, or for devices that maintain synchronization well. In one embodiment, the host can monitor how well a device stays synchronized over time, and can download a program change to the device to require reporting more or less often, depending on historical performance.

In another embodiment, the host need not have its own time, but can receive effect start and report signals from the multiple devices, compare them, and send out a correction to one or both. For example, one device could be instructed to slow down, and another to speed up, to lessen the abruptness of the change on one device.

In another embodiment, the devices can communicate directly with each other, rather than with a host. For example, a bigger device, such as a keyboard, may have more processing power than, for example, a mouse. The keyboard could then act both as a device and the host. Alternately, the host could be a smartphone or any other device.

In one embodiment, the program download to the device is done using WiFi, while the reports and synch commands use Bluetooth. In one embodiment, the reports and commands are sent as packets interspersed with transmitted data on a WiFi or other wireless channel, such as sound data to and from a headset.

A variety of effects can be used. For example, for lighting effects, individual keys or buttons could be lit up with different colors, or the same color. A wave or other pattern can periodically sweep through the buttons, or the effects can be provided on or around the keys hit by the user. The effects could also light up the whole housing, or its perimeter. The keys could be grouped in zones with the same color or effect. A glowing effect could simply increase and decrease the intensity. The lighting effects can be coordinated with sound effects, haptic effects or other effects, or those effects could be used instead of lighting effects.

In an alternate embodiment, the host can periodically send a synchronization command to the device, rather than having the device periodically report. However, the inventors have determined that less power is used with device reporting, since the device then needs to be constantly listening, and each command from the host must be processed, using power, regardless of whether synchronization is needed.

In one embodiment, effects are synchronized even though the effects are different. For example, one device may use RGB (Red, Green, Blue) colors, while another uses CMYK (Cyan, Magenta, Yellow, and Key [black]). The effects may also be different in brightness, or could be completely different effects that are coordinated in timing to achieve a desired overall effect, like the coordinating of different instruments in an orchestra.

In one embodiment, basic or simple effects are embedded in firmware or ROM. More complicated effects are programmed in software and downloaded to the device, and can operate independently of the firmware effects, or can utilize the firmware effects while adding to them. Alternately, more complex effects can be imbedded in higher value products. In one embodiment, effects are programmed in firmware, with parameters that can be downloaded to vary the effect.

As will be understood by those of skill in the art, the present invention can be embodied in other forms. Accordingly, the foregoing description is illustrating, but not limiting, of the scope of the invention which is set forth in the following claims.

What is claimed is:

1. A non-transitory computer readable media including instructions that configure one or more processors of a host to perform the steps of:

providing a first peripheral effect to a first peripheral device;

providing a second peripheral effect to a second peripheral device;

processing a signal indicating the synchronized start of the first peripheral effect and the second peripheral effect;

receiving a report from the first peripheral device on a current timing of the first peripheral effect;

receiving a report from the second peripheral device on a current timing of the second peripheral effect;

comparing the current timing of the first peripheral effect and the current timing of the second peripheral effect to a host timer corresponding to the synchronized start of the first and second peripheral effects;

determining if the timing of the first peripheral effect has varied from the host timer by more than a first predetermined amount;

sending a first synchronization signal to the first peripheral device if the first peripheral effect has varied from the host timer by more than the first predetermined amount;

determining if the timing of the second peripheral effect has varied from the host timer by more than a second predetermined amount; and sending a second synchronization signal to the second peripheral device if the second peripheral effect has varied from the host timer by more than the second predetermined amount.

2. The computer readable media of claim 1 further comprising instructions that configure the processor on the host to perform the steps of:

communicating between the host and the first peripheral device with a first direct communication channel between a host transceiver and a first peripheral transceiver, and communicating between the host and the second peripheral device with a second direct communication channel between the host transceiver and a second peripheral transceiver.

3. The computer readable media of claim 2 wherein the first and second direct communication channels are USB or Bluetooth® transmission channels.

4. The computer readable media of claim 1 further comprising instructions that configure the processor on the host to perform the steps of:

transmitting by the host to the first and second peripheral devices a signal indicating the synchronized start of the first and second peripheral effects.

5. The computer readable media of claim 1 wherein the peripheral effects are each one of a lighting effect, a sound effect or a haptic effect.

6. The computer readable media of claim 1 wherein the first and second peripheral effects are cyclic, and further comprising instructions that configure the processor on the host to perform the steps of:

sending the first and second reports once in each cycle of the first and second peripheral effects, in a first half of the peripheral effect cycle.

7. The computer readable media of claim 1 further comprising instructions that configure the processor on the host to perform the steps of:

indicating with a peripheral device timer a position where it is in the peripheral effect; and tracking the position in the peripheral effect with a host timer.

8. The computer readable media of claim 1 further comprising instructions that configure the processor on the host to perform the steps of:

providing a user interface on the host allowing a user to change the peripheral effects; and maintaining the peripheral devices synchronized without further user input after changes to the peripheral effects.

9. The computer readable media of claim 1:

wherein the first peripheral effect is a lighting effect and the second peripheral effect is a sound effect.

10. The computer readable media of claim 1:

wherein the first and second synchronization signals cause the first and second peripheral devices to reestablish synchronization by speeding up or slowing down the first or second peripheral effects.

11. A method for controlling a host to synchronize a first peripheral effect on a first peripheral device and a second peripheral effect on a second peripheral device, comprising:

providing the first peripheral effect to the first peripheral device;

providing the second peripheral effect to the second peripheral device;

processing a signal indicating the synchronized start of the first peripheral effect and the second peripheral effect;

receiving a report from the first peripheral device on a current timing of the first peripheral effect;

receiving a report from the second peripheral device on a current timing of the second peripheral effect;

comparing the current timing of the first peripheral effect and the current timing of the second peripheral effect to a host timer corresponding to the synchronized start of the first and second peripheral effects;

determining if the timing of the first peripheral effect has varied from the host timer by more than a first predetermined amount;

sending a first synchronization signal to the first peripheral device if the first peripheral effect has varied from the host timer by more than the first predetermined amount;

determining if the timing of a second peripheral effect has varied from the host timer by more than a second predetermined amount; and sending a second synchronization signal to a second peripheral device if the second peripheral effect has varied from the host timer by more than the second predetermined amount.

12. The method of claim 11 further comprising:

communicating between the host and the first peripheral device with a first direct communication channel between a host transceiver and a first peripheral transceiver, and communicating between the host and the second peripheral device with a second direct communication channel between the host transceiver and a second peripheral transceiver.

13. The method of claim 11 wherein the first and second direct communication channels are USB or Bluetooth® transmission channels.

14. The method of claim 11 further comprising:

transmitting by the host to the first and second peripheral devices a signal indicating the synchronized start of the first and second peripheral effects.

15. The method of claim 11 wherein the peripheral effects are each one of a lighting effect, a sound effect or a haptic effect.

16. The method of claim 11:

wherein the first peripheral effect is a lighting effect and the second peripheral effect is a sound effect.

17. A system for synchronizing peripheral effects among multiple peripheral devices, comprising:

a first peripheral device;

a first peripheral effect subsystem in the first peripheral device programmed to provide a first peripheral effect over a period of time and to provide a series of first timing reports on the current timing of the first peripheral effect, wherein the first peripheral effect is one of a lighting effect, a sound effect and a haptic effect;

a first peripheral device data memory mounted in the first peripheral device and containing peripheral effect data usable to generate the first peripheral effect;

a transceiver coupled to the first peripheral device and configured to receive the first timing reports from the first peripheral effect subsystem and transmit the reports wirelessly;

the first peripheral effect subsystem being programmed to receive a first synchronization signal and to modify the timing of the first peripheral effect in accordance with the first synchronization signal;

non-transitory computer readable media including instructions that configure a processor on a host to perform the steps of processing a signal indicating the synchronized start of the first peripheral effect and a second peripheral effect;

receiving the first report and a second report and comparing them to a host timer corresponding to the synchronized start of the first and second peripheral effects;

determining if the timing of the first peripheral effect has varied from the host timer by more than a first predetermined amount;

sending the first synchronization signal to the first peripheral device if the first peripheral effect has varied from the host timer by more than the first predetermined amount;

determining if the timing of a second peripheral effect has varied from the host timer by more than a second predetermined amount; and sending the second synchronization signal to a second peripheral device if the second peripheral effect has varied from the host timer by more than the second predetermined amount.

18. The system of claim 17 wherein the non-transitory computer readable media further includes instructions that configure the processor on the host to perform the steps of:

communicating between the host and the first peripheral device with a first direct communication channel between a host transceiver and a first peripheral transceiver, and communicating between the host and the second peripheral device with a second direct communication channel between the host transceiver and a second peripheral transceiver.

19. The system of claim 18 wherein the first and second direct communication channels are USB or Bluetooth® transmission channels.

20. The system of claim 17 wherein the peripheral effects are each one of a lighting effect, a sound effect or a haptic effect.

* * * * *